US005243334A

United States Patent [19]
Georgiou et al.

[11] Patent Number: 5,243,334
[45] Date of Patent: Sep. 7, 1993

[54] PARTITIONED SWITCH WITH DISTRIBUTED CLOCKS

[75] Inventors: Christos J. Georgiou, White Plains; Thor A. Larsen, Hopewell Junction, both of N.Y.

[73] Assignee: International Business Machines Corporation, Armonk, N.Y.

[21] Appl. No.: 752,813

[22] Filed: Aug. 30, 1991

[51] Int. Cl.[5] ............................ H04Q 11/06
[52] U.S. Cl. ............... 340/825.03; 340/825.79; 340/825.80; 340/826; 370/58.1; 370/60; 370/63
[58] Field of Search ............ 340/825.02, 825.03, 340/825.79, 825.80, 826, 825.14; 370/58.1, 58.2, 58.3, 60, 60.1, 63, 64, 65, 65.5

[56] References Cited

U.S. PATENT DOCUMENTS

| | | | |
|---|---|---|---|
| 4,400,627 | 8/1983 | Zola | 307/115 |
| 4,417,245 | 11/1983 | Melas et al. | 340/825.8 |
| 4,695,999 | 9/1987 | Lebizay | 370/58 |
| 4,737,951 | 4/1988 | Kruger et al. | 370/58 |
| 4,796,254 | 1/1989 | van Baardwijk et al. | 370/58 |
| 4,797,875 | 1/1989 | Pospischil et al. | 370/92 |
| 4,809,260 | 2/1989 | Davidson et al. | 370/58 |
| 4,843,606 | 6/1989 | Bux et al. | 370/58.1 |
| 4,873,694 | 10/1989 | Schmidt et al. | 370/58.1 |
| 4,903,260 | 5/1990 | Boettle et al. | 370/60 |
| 4,905,222 | 2/1990 | Seeger et al. | 370/58.1 |
| 4,929,939 | 5/1990 | Varma et al. | 340/825.8 |
| 5,107,493 | 4/1992 | Eng et al. | 370/60 |

*Primary Examiner*—Donald J. Yusko
*Assistant Examiner*—Michael Horabik
*Attorney, Agent, or Firm*—Sterne, Kessler, Goldstein & Fox

[57] ABSTRACT

A partitioned switch having distributed clocks includes a global matrix switch and one or more self-contained mini-switches. The mini-switches each contain ports connected via a local matrix switch. Communication between ports located in the same mini-switch is performed synchronously and in parallel via the local matrix switch. Communication between ports located in different mini-switches is performed asynchronously and serially via the global matrix switch. The mini-switches control the global matrix switch by serially and asynchronously sending control information to the global matrix switch.

20 Claims, 3 Drawing Sheets

PARTITIONED SWITCH WITH DISTRIBUTED CLOCKS

TECHNICAL FIELD

The present invention relates generally to communication systems, and more particularly to communication switches.

BACKGROUND ART

Conventional dynamic communication switches provide system-wide, non-blocking connectivity. The structure and operation of such switches are well known, having been described in many publically available documents such as U.S. Pat. No. 4,635,250 to Georgiou and U.S. Pat. No. 4,630,045 to Georgiou.

These conventional switches each include a centralized system clock that is used to synchronize data transfers from port to port through a matrix switch. At high bit-rates, however, the design of the centralized system clock to assure proper data synchronization becomes very complex.

A possible solution for relieving the demands on the centralized system clock and data synchronization is to transfer the data between the ports and the switching matrix in parallel form. However, as data rates and size of the switching matrix increase, parallel data transfer becomes a very difficult implementation problem due to the large number of signal lines needed. Specifically, it becomes difficult to simultaneously clock all the signal lines. This problem is called clock skewing.

In addition to synchronously transferring data between the ports and matrix switch, the conventional switches ordinarily transfer control information between the ports and matrix switch in a synchronous fashion. Consequently, the design of the centralized system clock is further complicated since clocks of different rates are required.

A prior solution to the above problems is presented in U.S. Pat. No. 4,809,260 to Davidson et al. Davidson describes a telephone time division multiplex (TDM) non-blocking switching system arranged in a star topology. The transmission of data through the switching system is done utilizing a self-clocking pulse code modulation (PCM) technique (Manchester code). The data is extracted at each destination by using a clock-bit incorporated in every data bit cell. This prior solution is flawed, however, as it reduces the effective bandwidth of the links by 50%.

DISCLOSURE OF INVENTION

The present invention is directed to a partitioned switch having distributed clocks. The switch of the present invention includes a global matrix switch and one or more self-contained mini-switches. The mini-switches each contain ports connected via a local matrix switch.

According to the present invention, communication between ports located in the same mini-switch is performed synchronously and in parallel via the local matrix switch. Communication between ports located in different mini-switches is performed asynchronously and serially via the global matrix switch. When receiving from the global matrix switch, the mini-switches adjust for phase differences between transmitting and receiving clocks.

The mini-switches control the global matrix switch in order to establish physical connections between the mini-switches via the global matrix switch. According to the present invention, the mini-switches control the global matrix switch by serially and asynchronously sending control information to the global matrix switch.

The foregoing and other objects, features and advantages of the invention will be apparent from the following more particular description of preferred embodiments of the invention, as illustrated in the accompanying drawings.

BRIEF DESCRIPTION OF DRAWINGS

The present invention will be described with reference to the accompanying drawings, wherein.

BEST MODE FOR CARRYING OUT THE INVENTION

Figure 1:
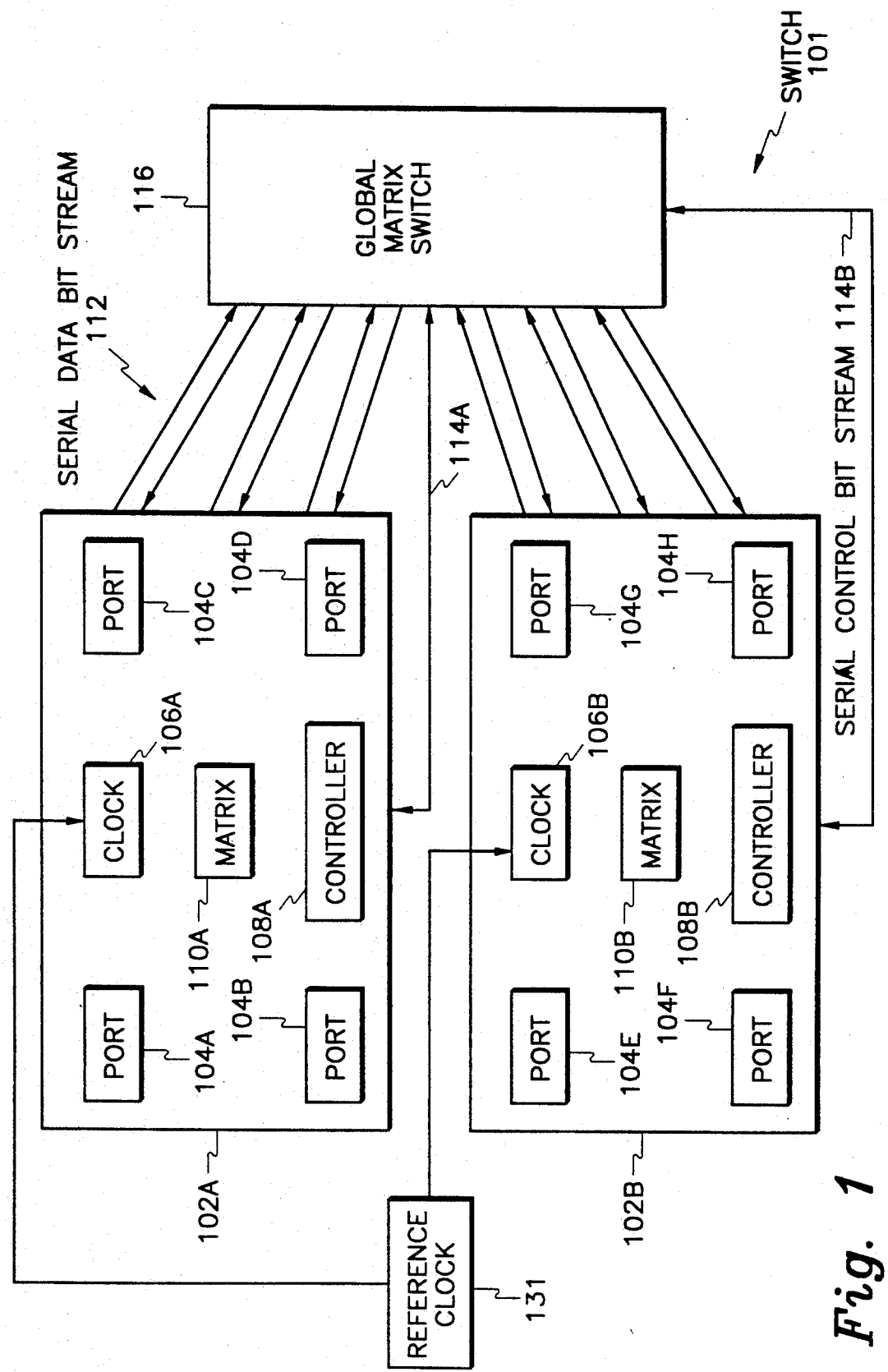
FIG. 1 illustrates a structural diagram of a partitioned switch according to the present invention.

FIG. 1 illustrates a structural diagram of a partitioned switch 101 according to the present invention. The switch 101 includes one or more self-contained mini-switches 102, a global matrix switch 116, and a low frequency reference clock 131.

Each mini-switch 102 contains ports 104, a clock 106, a local matrix switch 110, and a local matrix switch controller 108. External nodes 202 connect to the mini-switches 102 via the ports 104.

According to the present invention, all clocks in the switch 101 (such as the clocks 106A, 106B in the mini-switches 102) are synthesized from the reference clock 131. The use of the reference clock 131 to synthesize these clocks is possible since the switch 101 is contained within a relatively small area. Note, however, that all these clocks (such as the clocks 106A, 106B in the mini-switches 102A, 102B) are independently synthesized from the reference clock 131.

According to the present invention, communication between ports 104 within the same mini-switch 102 is performed synchronously via the local matrix switch 110. For example, communication between ports 104A and 104B of mini-switch 102A is performed synchronously via the local matrix switch 110A. Such synchronous communication may occur either serially or in parallel. However, according to the preferred embodiment of the present invention, such synchronous communication occurs in parallel.

According to the present invention, communication between ports 104 within different mini-switches 102A, 102B is performed asynchronously and serially via the global matrix switch 116. For example, communication between port 104A of the mini-switch 102A and port 104G of the mini-switch 102B is performed asynchronously and serially via the global matrix switch 116.

Note that, because communication between mini-switches 102 is performed asynchronously, the centralized clock design problem described above is solved since a centralized clock is not required. Also note that, because communication between mini-switches 102 is performed serially, the clock skew problem associated with parallel transfers through the global matrix 116 is solved. The clock skew problem within a mini-switch 102 does not occur since the ports 104 are limited in number and are close together. For example, a mini-switch 102 may be completely located on one circuit board or on one chip. Further note that, because communication between mini-switches 102 is performed serially and asynchronously, high data rates through the matrix switch 116 may be achieved.

Figure 2:
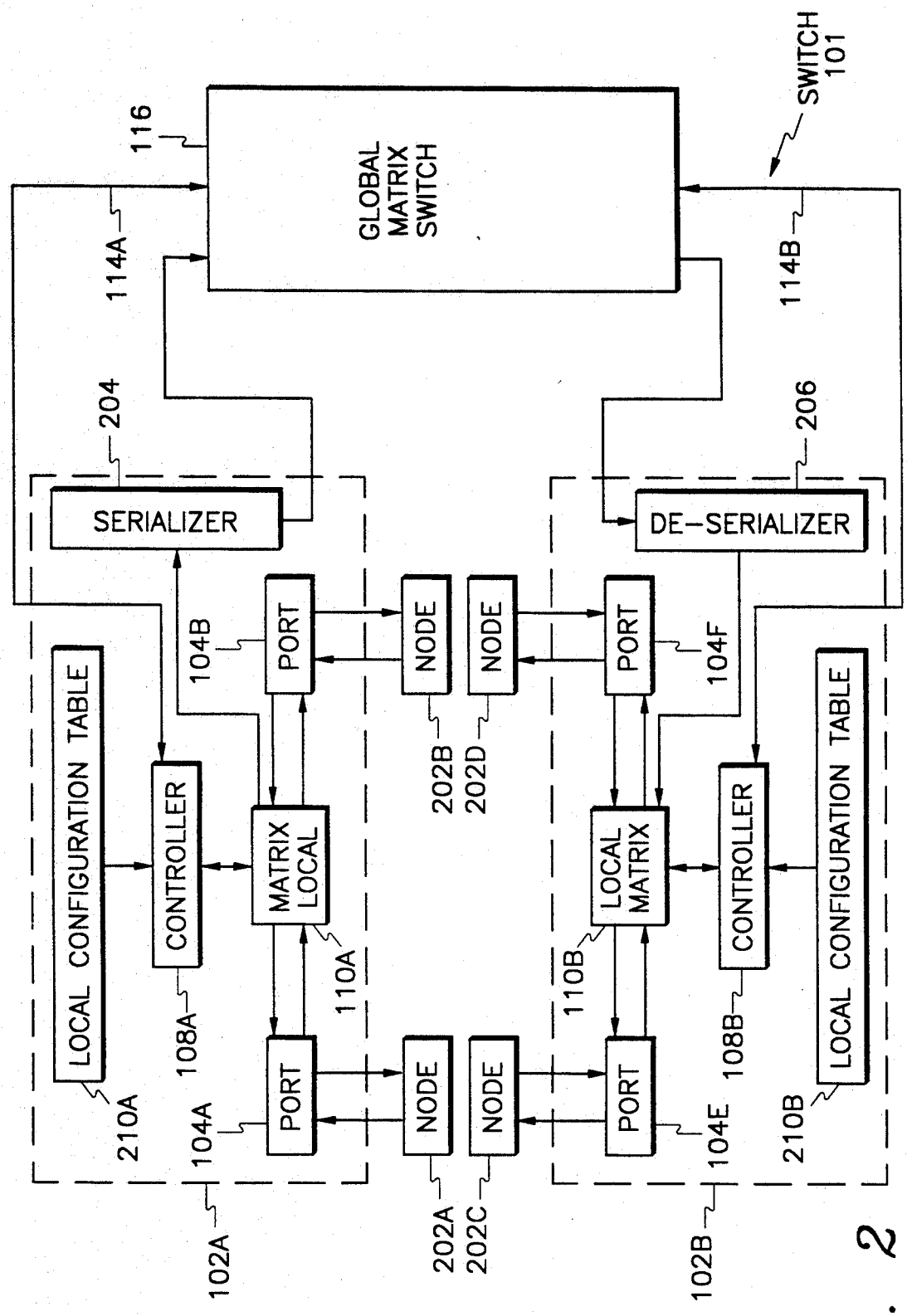
FIG. 2 illustrates the partitioned switch of the present invention in greater detail.

FIG. 2 illustrates the switch 101 of the present invention in greater detail. Each mini-switch 102, in addition to the elements listed above, also includes both a serializer 204 and a de-serializer 206 (this is true, even though the mini-switch 102A is shown as having only a serializer 204, and the mini-switch 102B is shown as having only a de-serializer 206). As shown in FIG. 2, data is sent from a local matrix 110A in a mini-switch 102A to the global matrix switch 116 via the serializer 204 in the mini-switch 102A. Data is sent from the global matrix switch 116 to a local matrix 110B in a mini-switch 102B via the de-serializer 206 in the mini-switch 102B.

Each mini-switch 102, in addition to the elements listed above, also includes a local configuration table 210 The local configuration table 210 contains local and global connectivity information. For example, the local configuration table 210A in the mini-switch 102A contains local connectivity information that indicates that nodes 202A and 202B are connected to ports 104A and 104B, respectively. The local configuration table 210A in the mini-switch 102A also contains global connectivity information that indicates that nodes 202C and 202D are connected to the mini-switch 102B.

The operation of the present invention is now described according to a scenario wherein node 202A is communicating with node 202B.

The node 202A serially transmits a data frame to the port 104A. The port 104A parallelizes the frame by storing the frame into a buffer inside the port 104A (not shown in FIG. 2). Logic circuitry inside the port 104A (not shown in FIG. 2) extracts connection information from the frame while the frame is in the buffer. The connection information identifies the destination of the frame. The connection information is sent to the local matrix controller 108A.

Upon receiving the connection information, the local matrix controller 108A determines that the frame's destination is the node 202B which is connected to the port 104B. The local matrix controller 108A makes this determination based on information in its local configuration table 210A.

The local matrix controller 108A attempts to make a connection in the local matrix switch 110A between the port 104A and the port 104B For illustrative purposes, assume that such a connection is made in the local matrix switch 110A The connection in the local matrix switch 110A operates as a physical connection between the ports 104A and 104B.

After a connection in the local matrix switch 110A is established, the port 104A synchronously and in parallel transmits the frame in the buffer to the local matrix switch 110A. The port 104B receives the frame. The port 104B then serializes the frame and serially sends the frame to the node 202B.

Note that the port 104A synchronously transmits the frame according to the clock 106A in the mini-switch 102A. Similarly, the port 104B synchronously receives the frame according to the clock 106A in the mini-switch 102A.

The operation of the present invention is now described according to a scenario wherein node 202A is communicating with node 202D.

The node 202A serially transmits a data frame to the port 104A. The port 104A parallelizes the frame by storing the frame into a buffer inside the port 104A (not shown in FIG. 2). Logic circuitry inside the port 104A (not shown in FIG. 2) extracts connection information from the frame while the frame is in the buffer. The connection information identifies the destination of the frame. The connection information is sent to the local matrix controller 108A.

Upon receiving the connection information, the local matrix controller 108A determines that the frame's destination is the node 202D which is connected to the mini-switch 102B. The local matrix controller 108A makes this determination based on information in its local configuration table 210A.

The local matrix controller 108A attempts to make a connection in the local matrix switch 110A between the port 104A and the serializer 204. The local matrix controller 108A also attempts to make a connection in the global matrix switch 116 between the serializer 204 in the mini-switch 102A and the de-serializer 206 in the mini-switch 102B. The local matrix controller 108A attempts to make this connection in the global matrix switch 116 by serially and asynchronously sending control information to the global matrix switch 116 on control and configuration lines 114A.

By sending control information to the global matrix switch 16 in a serial and asynchronous manner, the control interconnect between the mini-switches 102 and the global matrix switch 116 is simplified.

For illustrative purposes, assume that such connections in the local matrix switch 110A and the global matrix switch 116 are established.

After a connection in the local matrix switch 110A is established, the port 104A synchronously and in parallel transmits the frame in the buffer to the serializer 204. The serializer 204 then serializes the frame and serially sends the frame (via the global matrix switch 116) to the de-serializer 206 in the mini-switch 102B at a transmit frequency determined by the clock 106A in the mini-switch 102A.

Figure 3:
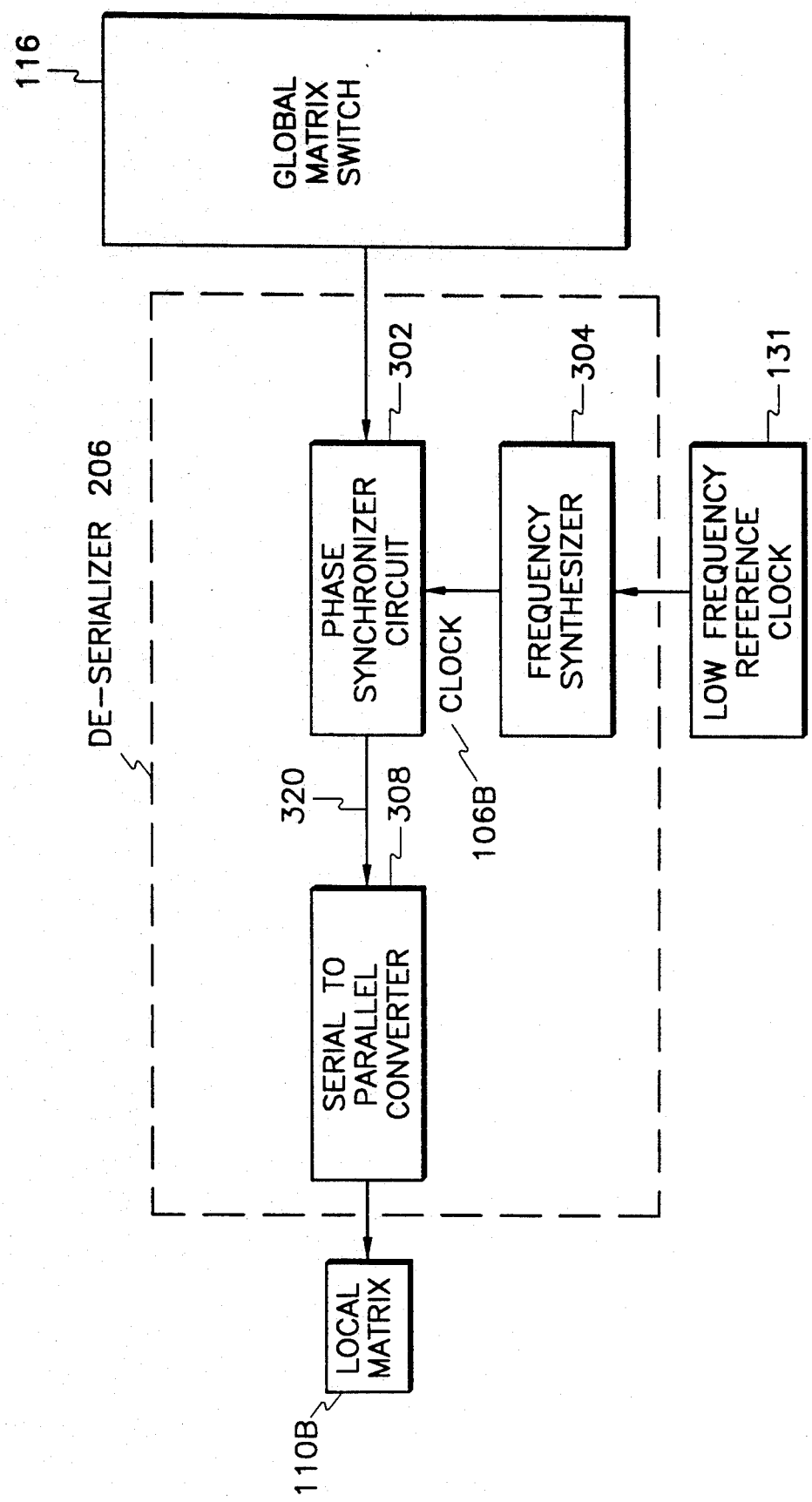
FIG. 3 illustrates the structure of a de-serializer of the present invention.

The de-serializer 206 in the mini-switch 102B serially receives the frame at a receive frequency determined by the clock 106B in the mini-switch 102B. FIG. 3 illustrates the structure of the de-serializer 206. The de-serializer 206 includes a phase synchronizer circuit 302, a frequency synthesizer 304, and a serial-to-parallel converter 308.

According to the present invention, the receive frequency determined by the clock 106B is equal to the transmit frequency determined by the clock 106A. However, since the frame is asynchronously transmitted through the global matrix switch 116, the transmit frequency may be out of phase with the receive frequency. Therefore, the phase synchronizer circuit 302 in the de-serializer 206 adjusts for phase of the incoming data frame to align with the transmit frequency.

The phase synchronizer circuit 302 can be implemented in a number of ways which are well known in the art. One way is to use a phase lock loop. Other ways are described in many publically available documents such as "1 Gb/s High-Speed Bit Synchronization LSI for B-ISDN" by Otsuka (*Electronics Letters*, vol. 26, No. 10, May 10, 1990), which is herein incorporated by reference in its entirety.

Note that the phase synchronizer circuit 302 receives the clock 106B (which determines the receive frequency) from the frequency synthesizer 304. The frequency synthesizer 304 synthesizes the clock 106B from the low frequency reference clock 131, which is common to all of the mini-switches 102.

The phase synchronizer circuit 302 aligns the phase of the incoming data stream with the clock such that the clock transition occurs approximately in the center of the data pulse. This alignment assures the optimum point to minimize sampling errors. Since the phase synchronizer circuit 302 has some latency (that is, a number of bits are needed for alignment), the data stream is preceded by a number of synchronizing bits.

The phased adjusted bits of the frame are serially sent to the serial-to-parallel converter 308, which parallelizes the frame by storing the frame into a buffer inside the serial-to-parallel converter 308 (not shown in FIG. 3). Logic circuitry inside the serial-to-parallel converter 308 (not shown in FIG. 3) extracts connection information from the frame while the frame is in the buffer. The connection information identifies the destination of the frame. The connection information is sent to the local matrix controller 108B.

Upon receiving the connection information, the local matrix controller 108B determines that the frame's destination is the node 202D which is connected to the port 104F. The local matrix controller 108B makes this determination based on information in its local configuration table 210B.

The local matrix controller 108B attempts to make a connection in the local matrix switch 110B between the de-serializer 206 and the port 104F. For illustrative purposes, assume that such a connection is made in the local matrix switch 110B. The connection in the local matrix switch 110B operates as a physical connection between the de-serializer 206 and the port 104F.

After a connection in the local matrix switch 110B is established, the serial-to-parallel converter 308 synchronously and in parallel transmits the frame in the buffer to the local matrix switch 110B. The port 104F receives the frame. The port 104F then serializes the frame and serially sends the frame to the node 202D.

As noted above, the global matrix switch 116 receives control information in an asynchronous manner. Therefore, the global matrix switch 116 must perform phase adjustment. The global matrix switch 116 performs such phase adjustment according to the techniques described above.

The switch 101 of the present invention has a modular design in that it includes the self-contained mini-switches 102 and the global matrix switch 116. Since it has a modular design, the switch 101 minimizes a user's initial start up costs since the user need only obtain the global matrix 116 and one mini-switch 102 to begin using the switch 101. Also, the switch 101 facilitates a user's future expansion since the user can add additional nodes by adding additional mini-switches 102.

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. A communication switch comprising:
   (1) a first mini-switch comprising a plurality of first ports;
   (2) first synchronous transmitting means for synchronously transmitting data between selected ones of said plurality of first ports;
   (3) a second mini-switch comprising a plurality of second ports;
   (4) second synchronous transmitting means for synchronously transmitting data between selected ones of said plurality of second ports;
   (5) a global matrix switch, coupled to said first and second mini-switches, for establishing communication between said first and second mini-switches;
   said first mini-switch further comprising inter mini-switch transmitting means for serially and asynchronously transmitting data to said second mini-switch via said global matrix switch; and
   said second mini-switch further comprising receiving means for serially and asynchronously receiving data from said first mini-switch via said global matrix switch.

2. The communication switch of claim 1, wherein said first mini-switch further comprises:
   (a) local switch means, coupled to said plurality of first ports, for establishing local communications between selected ones of said plurality of first ports; and
   (b) control means, coupled to said global matrix switch and said local switch means, comprising:
      (i) global control means for causing said global matrix switch to establish said communications between said first and second mini-switches; and
      (ii) local control means for causing said local switch means to establish said local communications between said selected first ports.

3. The communication switch of claim 2, wherein said first synchronous transmitting means comprises means for synchronously transmitting data in parallel between said first ports via said local switch means.

4. The communication switch of claim 3, wherein said first mini-switch further comprises a serializer, coupled to said global matrix switch, and said local switch means, and wherein said control means further comprises means for causing said local switch means to establish communications between a selected one of said plurality of first ports and said serializer.

5. The communication switch of claim 2, wherein said global control means comprises means for serially and asynchronously transmitting control information to said global matrix switch.

6. The communication switch of claim 1, wherein said inter mini-switch transmitting means transmits at a transmit frequency, and wherein said receiving means receives at a receive frequency.

7. The communication switch of claim 6, wherein said receiving means comprise phase synchronizing means for adjusting for phase differences between said transmit and receive frequencies.

8. The communication switch of claim 7, wherein said receiving means further comprise:
   (i) buffer means, coupled to said phase synchronizing means, for temporarily storing data while said data is being phase adjusted by said phase synchronizing means; and
   (ii) serial-to-parallel conversion means, coupled to said phase synchronizing means, for parallelizing said data after said data has been phase adjusted by said phase synchronizing means.

9. The communication switch of claim 6, further comprising a reference clock.

10. The communication switch of claim 9, wherein said first mini-switch further comprises first frequency synthesizing means for synthesizing said transmit frequency from said reference clock, and wherein said second mini-switch further comprises second frequency synthesizing means for synthesizing said receive frequency from said reference clock.

11. A communication network comprising:
   a plurality of communication switches, each of said plurality of switches comprising
   a first mini-switch comprising a plurality of first ports, and first synchronous transmitting means for synchronously transmitting data between selected ones of said plurality of first ports;
   a second mini-switch comprising a plurality of second ports, and second synchronous transmitting means for synchronously transmitting data between selected ones of said plurality of second ports;
   a global matrix switch, coupled to said first and second mini-switches, for establishing asynchronous communications between said first and second mini-switch;
   said first mini-switch further comprising serializer means for serially and asynchronously transmitting data to said second mini-switch via said global matrix switch; and
   said second mini-switch further comprising de-serializer means for serially and asynchronously receiving data from said first mini-switch via said global matrix switch.

12. The communication network of claim 11, further comprising control means, coupled to said global matrix switch, for causing said global matrix switch to establish said asynchronous communications.

13. The communication network of claim 12, wherein said control means comprises means for serially and synchronously transmitting control information to said global matrix switch.

14. The communication network of claim 11, wherein said serializer means transmits at a transmit frequency, and wherein said de-serializer means receives at a receive frequency.

15. The communication network of claim 14, wherein said de-serializer means comprise phase synchronizing means for adjusting for phase differences between said transmit and receive frequencies.

16. The communication network of claim 14, wherein said first mini-switch further comprises first frequency synthesizing means for synthesizing said transmit frequency from a reference clock, and wherein said second mini-switch further comprises second frequency synthesizing means for synthesizing said receive frequency from said reference clock.

17. A method for transmitting a frame from a first port to a second port within a communication switch, the communication switch having a plurality of mini-switches, each mini-switch including a plurality of ports, said method comprising the steps of:
   (a) determining whether the first and second ports are in the same mini-switch;
   (b) synchronously transmitting the frame from the first port to the second port if the first and second ports are in the same mini-switch; and
   (c) asynchronously and serially transmitting the frame from the first port to the second port if the first and second ports are not in the same mini-switch.

18. The method of claim 17, wherein said synchronously transmitting step comprises the steps of:
   (1) controlling a local switch to establish a connection between the first and second ports; and
   (2) synchronously transmitting the frame in parallel between the first and second ports via said connection.

19. The method of claim 17, wherein said asynchronously and serially transmitting step comprises the steps of:
   (1) controlling a global matrix switch to establish a connection between the first and second ports;
   (2) asynchronously and serially transmitting the frame at a transmit frequency from the first port to the global matrix switch;
   (3) asynchronously and serially receiving at a receive frequency the frame from the global matrix switch;
   (4) adjusting for phase differences between said transmit and receive frequencies;
   (5) parallelizing the frame; and
   (6) synchronously transmitting the frame in parallel to the second port.

20. The method of claim 19, wherein said step for controlling a global matrix switch comprises the step of asynchronously and serially sending control information to said global matrix switch.

* * * * *